(12) United States Patent
Luk

(10) Patent No.: US 8,130,945 B2
(45) Date of Patent: Mar. 6, 2012

(54) ENCRYPTED CRYPTOGRAPHY SYSTEM

(76) Inventor: Fong Luk, Alameda, CA (US)

( * ) Notice: Subject to any disclaimer, the term of this patent is extended or adjusted under 35 U.S.C. 154(b) by 1256 days.

(21) Appl. No.: 11/249,892

(22) Filed: Oct. 13, 2005

(65) Prior Publication Data

US 2006/0078121 A1 Apr. 13, 2006

Related U.S. Application Data

(60) Provisional application No. 60/618,740, filed on Oct. 13, 2004.

(51) Int. Cl.
*H04K 1/00* (2006.01)

(52) U.S. Cl. .......... 380/28; 380/260; 380/267; 380/268; 380/282; 380/285; 380/30; 380/1; 380/200; 380/243; 380/247; 380/251; 380/255; 380/277; 713/171; 713/189; 708/255

(58) Field of Classification Search .................. 380/255, 380/1, 28, 30, 200, 243, 247, 251, 260, 267, 380/268, 282, 285; 713/171; 708/255
See application file for complete search history.

(56) References Cited

U.S. PATENT DOCUMENTS

| | | | | |
|---|---|---|---|---|
| 4,968,978 A * | 11/1990 | Stolarczyk | ................. | 340/854.6 |
| 5,442,706 A * | 8/1995 | Kung | .............................. | 380/30 |
| 5,812,671 A * | 9/1998 | Ross, Jr. | ......................... | 713/153 |
| 6,253,326 B1 * | 6/2001 | Lincke et al. | ................. | 417/534 |
| 6,636,887 B1 * | 10/2003 | Augeri | ........................... | 709/203 |
| 6,785,258 B1 * | 8/2004 | Garcia et al. | .................. | 370/344 |
| 6,907,123 B1 * | 6/2005 | Schier | .............................. | 380/28 |
| 6,907,126 B2 * | 6/2005 | Inada | ............................. | 380/255 |
| 7,110,548 B1 * | 9/2006 | Ougi et al. | ..................... | 380/278 |
| 7,266,200 B2 * | 9/2007 | Lambert | ....................... | 380/263 |
| 7,295,673 B2 * | 11/2007 | Grab et al. | ..................... | 380/239 |
| 7,362,866 B2 * | 4/2008 | Zheng | ............................ | 380/270 |
| 7,436,955 B2 * | 10/2008 | Yan et al. | ......................... | 380/37 |
| 7,500,263 B2 * | 3/2009 | Venkatachary et al. | .......... | 726/4 |
| 2007/0300236 A1 * | 12/2007 | Hing | ............................. | 719/315 |

* cited by examiner

*Primary Examiner* — April Shan
(74) *Attorney, Agent, or Firm* — Bo-In Lin

(57) ABSTRACT

A public key cryptography (PKI or other similar system) is used to sent partial or multiple of encryption or decryption algorithm (cipher or decipher) to the data sender or receiver to encrypt or decrypt the data to be sent or received and destroy itself after each or multiple use. Since the encryption algorithm is protected, it can be devised very small in size in compare to the data to be sent and the user can afford to use large key size in it's transmission to increase protection without significant compact to the overall speed. Without knowing the encryption algorithm, which may also be changing from time to time, it will be impossible to use brut force to break the code provided that the algorithm scheme is designed properly. It is due to that there are unlimited numbers of new or old algorithms with countless variations and it takes years of supper fast computing time to break even few algorithms. Under this condition, many fast encryption algorithms can be easily devised for use, thus speed and safety can be greatly enhanced.

3 Claims, 1 Drawing Sheet

ENCRYPTED CRYPTOGRAPHY SYSTEM

This patent application is a Formal Application and claims a Priority Date of Oct. 13, 2004 as this Patent Application is benefited from a previously filed Provisional Application 60/618,740 filed on Oct. 13, 2004 by the same Sole Inventor of this Application.

BACKGROUND OF THE INVENTION

1. Field of the Invention

This invention relates generally to the architecture of the cryptographic systems for carrying out data encryption and decryptions for secured data transmission. More particularly, this invention relates to encryption algorithms structured for implementation in a cryptographic system to achieve higher level of security and higher speed of encryption and decryption operations.

2. Description of the Prior Art

Conventional cryptographic technologies are still confronted with difficulties and limitations due to the operational complexities of the current cryptographic systems. Specifically, the encryption and decryption operations are performed on the data using long and complex algorithms that applies many different keys. The complex operations impose heavy demands on computational resources. The processes also are time consuming, especially when high security level is required.

Therefore, a demand still exists in the art of cryptographic data transmission to provide new and improved system configuration and cryptographic algorithms that requires much less computational resources in order to achieve much faster transmission and higher security level.

SUMMARY OF THE PRESENT INVENTION

It is therefore an object of the present invention to provide a new and improved system configuration and cryptographic algorithms with much less computational requirement for the secured data transmission processes such that above-mentioned difficulties and limitations can be overcome.

This invention enhances encryption speed and security in several orders of magnitudes. The cryptographic systems and algorithms are built on top of the use of the public key cryptography (PKI) or other similar system. The computational coding processes of actual data transmission are greatly simplified and the time and resources required for decryptions are greatly reduced.

In a preferred embodiment, this invention uses conventional cryptographic system (public key cryptography (PKI) or any other type of cryptography system) to send partial or multiple of encryption or decryption algorithm (cipher or decipher) to the data sender or receiver. The partial or multiple of encryptions or decryption algorithms are applied to encrypt the data to be sent or to decrypt the data received. Then, these cipher or decipher may or may not destroy itself after each use. Since the encryption or decryption algorithm is protected, it can be devised very small in size in comparison to the data to be processed by it and the user can afford to use large key size in it's transmission via conventional cryptography system to increase protection without significant compact to the overall speed. Without knowing the encryption algorithm, which may also be changed from time to time, it will be impossible for the cryptanalysts (code breaker) to use brut force to break the code provided that the algorithm scheme is designed properly. It is due to that there are unlimited numbers of new or old cryptographic algorithms with countless variations and it takes years of supper fast computing time to break even few algorithms. Under this condition, many fast encryption algorithms can be easily devised for use, thus speed and safety can be greatly enhanced In a preferred embodiment, this invention discloses a method for sending an encrypted data from a sender to a receiver. The method includes a step for the sender encrypting a sender-selected-decipher using a public key system to send to the receiver so that the receiver can use it to decipher the ciphered data from the sender. In a preferred embodiment, the method further includes a step wherein the sender further selecting the sender-selected decipher comprising a scramble unit includes only exclusive-or and bit scramble function using a random data in a code page as a scramble template.

In another preferred embodiment, the invention further discloses a method for encrypting a set of data from a sender for sending to a receiver and decrypting said set of encrypted data. The method further includes a step the sender sending a symmetric key (S-key) to a receiver using a method of public key system for the receiver to use said symmetric key to send a receiver-selected-cipher by method of symmetric key system to the sender for the sender cipher said set of data. The sender encrypts a set of data into the set of encrypted data and sends to the receiver. In a preferred embodiment, the method further includes a step where the receiver deciphers the set of encrypted data by using the receiver-selected decipher. And, in another preferred embodiment, the receiver further selects the receiver-selected-cipher comprising a scramble unit includes only exclusive-or and bit scramble function using random generated data in a code page as a scramble template.

These and other objects and advantages of the present invention will no doubt become obvious to those of ordinary skill in the art after having read the following detailed description of the preferred embodiment, which is illustrated in the various drawing figures.

DETAILED DESCRIPTION OF THE PREFERRED EMBODIMENT

Figure 1:
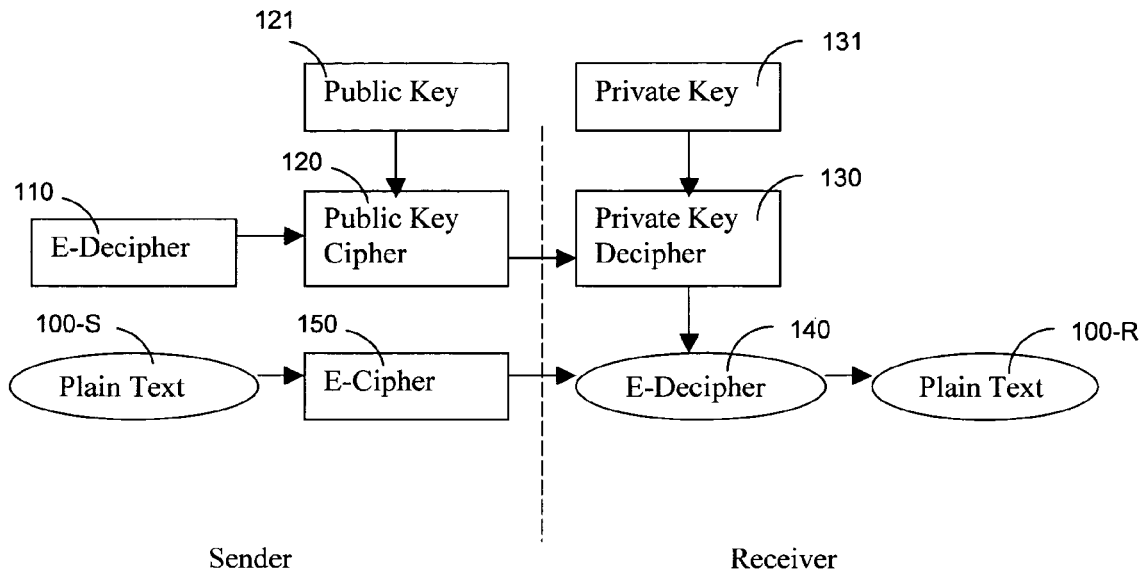
FIG. 1 is functional block diagram for illustrating one of the implementation of the encrypted cryptographic system using public key system (PKI) to transmit the E-cipher.

Referring to FIG. 1 for as a functional block diagram for a first embodiment of this invention. In an initial step, a sender-selected decipher, i.e., E-Decipher 110 is encrypted by PKI cipher 120 with a public key 121 and sent to the receiver. The receiver then decrypts the received data to recover the E-Decipher 140 by using PKI Decipher 130 with a private key 131, where E-Decipher 140 should be exactly the same as the E-Decipher 110. After the initial step, the plain text 100-S from a document sender is first encoded by the sender-selected E-cipher 150 and then sent to the receiver. The receiver then decrypts received data by using the E-Decipher 140 to recover the original plain text 100-R, where 100-R should be exactly the same as 100-S.

Figure 2:
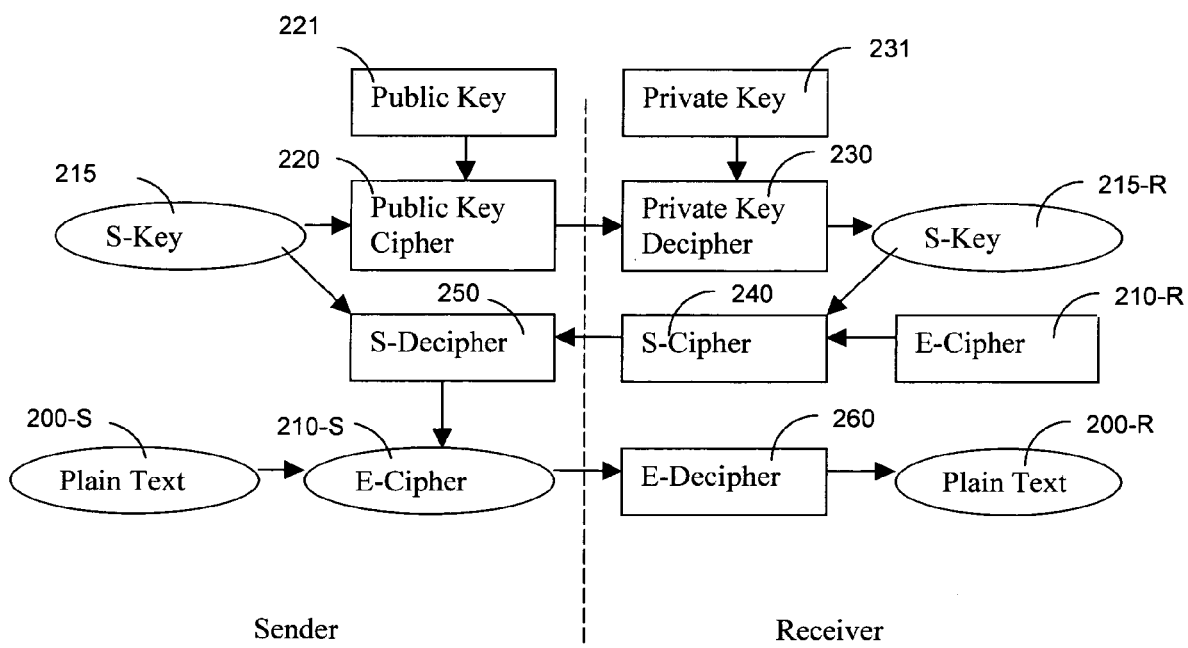
FIG. 2 is a functional block diagram for illustrating one of the implementation of the encrypted cryptographic system using a symmetric key to transmit the E-Cipher.

Referring to FIG. 2 for another preferred embodiment of this invention. In the initial step, the sender employing public key cipher 220 with a public key 221 to encrypt a symmetric key, i.e., S-Key 215 and send the encrypted S-key to a receiver. The receiver uses the private key decipher 230 with a private key 231 to decipher the encrypted S-key into the S-key 215-R, where S-key 215-R should be exactly the same as the S-key 215. The receiver then employs the symmetric cipher (S-Cipher 240) with the S-key 215-R to encrypt a receiver-selected-E-cipher 210-R and send the encrypted E-cipher to the sender. The sender then employs the symmetric decipher (S-decipher 250) with the S-key 215 to decipher and generate the E-Cipher 210-S, where E-Cipher 210-S should be exactly the same as the E-Cipher 210-R. After above initial step, the sender then applies the E-Cipher 210-S to encrypt sender's plain text 200-S. The E-Cipher encrypted data are sent to the receiver. The receiver then performs a decryption step by using the receiver-selected-E-Decipher 260 to generate a decrypted version of the plain text 200-R. The decrypted version of the plain text 200-R should be exactly the same as the sender's version of the plain text 200-S.

There can be many other configurations of this invention. Embodiment by using the configurations and processes disclosed above, which may also be implemented in a centralized Cryptographic server. The centralized cryptographic server may be employed for storing, sending and managing those E-ciphers, E-deciphers and keys.

This invention also provides one of possible construction example of the E-Cipher/E-Decipher as described above. The E-Cipher/E-Decipher pair such as E-Cipher 150/E-Decipher 140 in FIG. 1 and E-Cipher 210-S/E-Decipher 260 in FIG. 2 may include data scramble/de-scramble unit and a code page with randomly generated data. Part of the code page may be used a data scramble template and the rest of the code page may be used to define the encryption/decryption method. Following is a simplified example for illustration of different kinds of E-Cipher/E-Decipher:

1. The scramble unit for the E-Cipher comprises only exclusive-or and bit scramble function using the random data in the code page as scramble template.
2. The random data in one of the byte in the code page, e.g., the control byte, is used to define how the scramble unit scrambles data. Such as that the scramble unit will take plain text data to do an exclusive-or with the random data in certain part of the code page once every three byte and the rest to do bit scrambling, if bit one to three of the control byte is one, in which bit two and bit three control frequency of the operation changing such as once every two, three or four byte etc. and the bite one controls the swapping of the exclusive-or and bit scramble operation. There are many other more complex scheme can be devised in similar way so as to increase security, but this scheme should have more than enough security protection for most users.
3. The unscramble unit for the E-Decipher will be doing a reverse operation of above steps of 1 and 2 using the identical code page as de-scramble template.

For actual security evaluation, further simplification of the scramble unit may be achieved by arranging to employ only bit shifting function alone with a 32 bytes long code page and no control byte. The scramble unit shifts the plain text in 2 bytes length, in which the number of bits being shifted is determined by the random data in the code page in linear sequence cycle. Every four bits of code page random data define the number of bits position to be shifted for every 2 bytes of the plain text data. To break the code, the cryptanalysts first need to know the actual function of above scramble unit and the size of the code page. This means that they need to first break the key, which encrypts the E-cipher. Then they still need do full analysis of the E-cipher to determine if it is only doing shifting operation, the location and size of the code page. By that time the E-cipher may already been changed by the receiver. Be noted that the shifting operation is very simple computer operation and is in many order of magnitude faster then the PKI and other methods currently being used.

This invention therefore discloses a cryptographic system for encrypting data from a sender, sending it to a receiver and decrypting it. The cryptographic system includes a sender-selected-cipher/decipher means for allowing the sender to define a sender-selected-cipher/decipher. In a preferred embodiment, the cryptographic system further includes secured data transfer means for using a public key cryptographic system to send the sender-selected-decipher from the sender to the receiver to decipher encrypted data from the sender. In another preferred embodiment, the sender-selected cipher/decipher comprising a scramble/unscramble unit includes only exclusive-or and bit scramble function using a random data in a code page as a scramble/unscramble template.

This invention further discloses an alternate preferred embodiment of a cryptographic system for encrypting data from a sender, sending it to a receiver and decrypting it. The cryptographic system includes a receiver-selected-cipher/decipher means for allowing the receiver to define a receiver-selected-cipher/decipher. In a preferred embodiment, the cryptographic system further includes secured data transfer means for the sender to send a symmetric S-key using a public key cryptographic system to the receiver for the receiver to use the symmetric key cryptographic system to send back the receiver-selected-cipher to the sender. The cryptographic system further includes secured data transfer means for the receiver to send the receiver-selected-cipher to the sender using symmetric key cryptographic system for the sender to encrypt a set of data into the set of encrypted data to send to the receiver. In another preferred embodiment, the receiver-selected-cipher/decipher comprising a scramble/unscramble unit includes only exclusive-or and bit scramble function using a random data in a code page as a scramble template.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A method of encrypting and sending data from a sender to a receiver, comprising:
   said sender uses an encrypting/decrypting device to encrypt a sender-selected decipher (E-decipher) by a public key (PKI) cipher with a public key and send said encrypted E-decipher to said receiver wherein said E-decipher is designed to decrypt data encrypted by a sender-selected cipher (E-cipher) of said sender and said E-cipher is designed to encrypt data to be sent by said sender;
   said sender or said receiver applies said E-cipher or said E-decipher, respectively, to carry out a session of encrypted data transmission;
   said sender or said receiver applies said E-cipher or said E-decipher, respectively, to carry out the session of encrypted data transmission further comprising a step of using a random data in a code page as a scramble and unscramble template,
   wherein said E-cipher and said E-decipher include only exclusive-or and bit scramble function using the random data in the code page as the scramble and unscramble template;

wherein said E-cipher and said E-decipher are devised small in size in compare to the data to be sent by said sender;

wherein said E-cipher and said E-decipher are arbitrarily selected, applied and changed from time to time; and wherein said E-cipher and said E-decipher destroy themselves after arbitrary multiple uses.

2. A method encrypting a set of data from a sender to a receiver and decrypting said set of data received from said sender, comprising:

said sender uses an encrypting/decrypting device to encrypt a symmetric key (S-key) by a public key (PKI) cipher with a public key and send said encrypted S-key to said receiver;

said receiver uses a private key to decrypt said encrypted S-key to obtain said S-key;

said receiver uses said S-key to encrypt a receiver-selected-cipher (E-cipher) and send said encrypted E-cipher to said sender;

said sender uses said S-key to decrypt said encrypted E-cipher to obtain said E-cipher;

said receiver uses a receiver-selected-decipher (E-decipher) to decrypt data sent from said sender;

said sender or said receiver applies said E-cipher or said E-decipher, respectively, to carry out a session of encrypted data transmission;

said sender or said receiver applies said E-cipher or said E-decipher, respectively, to carry out the session of encrypted data transmission further comprising a step of using a random data in a code page as a scramble and unscramble template, wherein said E-cipher and said E-decipher include only exclusive-or and bit scramble function using the random data in the code page as the scramble and unscramble template;

wherein said E-cipher and said E-decipher are devised small in size in compare to the data to be sent by said sender;

wherein said E-cipher and said E-decipher are arbitrarily selected, applied and changed from time to time; and wherein said E-cipher and said E-decipher destroy themselves after arbitrary multiple uses.

3. A method encrypting a set of data from a sender to a receiver and decrypting said set of data received from said sender, comprising:

said receiver uses an encrypting/decrypting device to encrypt a receiver-selected-cipher (E-cipher) by a public key (PKI) cipher with a public key and send said encrypted E-cipher to said sender;

said sender uses a private key to decrypt said encrypted E-cipher to obtain said E-cipher;

said receiver uses a receiver-selected-decipher (E-decipher) to decrypt data sent from said sender;

said sender or said receiver applies said E-cipher or said E-decipher, respectively, to carry out a session of encrypted data transmission;

said sender or said receiver applies said E-cipher or said E-decipher, respectively, to carry out the session of encrypted data transmission further comprising a step of using a random data in a code page as a scramble and unscramble template, wherein said E-cipher and said E-decipher include only exclusive-or and bit scramble function using the random data in the code page as the scramble and unscramble template;

wherein said E-cipher and said E-decipher are devised small in size in compare to the data to be sent by said sender;

wherein said E-cipher and said E-decipher are arbitrarily selected, applied and changed from time to time; and wherein said E-cipher and said E-decipher destroy themselves after arbitrary multiple uses.

* * * * *